United States Patent Office 3,096,191
Patented July 2, 1963

3,096,191
ASPHALT AMINE SULFONATE ANTISTRIPPING AGENT FOR ASPHALT
Armin C. Pitchford, Bartlesville, Okla., assignor to Phillips Petroleum Company, a corporation of Delaware
No Drawing. Filed May 23, 1960, Ser. No. 31,219
4 Claims. (Cl. 106—275)

This invention relates to the production of asphaltic paving compositions. In one aspect it relates to production of an improved asphalt composition for coating paving aggregates. In another aspect it relates to an improved asphaltic composition and method for making same.

Sulphonic acids derived from asphaltic materials, for example, from asphaltenes, are neutralized according to this invention with amines containing from 11 to 21 carbon atoms per molecule of amines. Such neutralized materials when added to asphaltic paving compositions improve adhesion thereof for wet aggregates.

Paving compositions which are composed of mineral aggregate and bituminous constituents, usually asphalt, are widely used. This type of paving composition, while economical and durable, has a disadvantage of being subject to deterioration by moisture. One type of deterioration results from the mineral aggregate having a greater affinity for moisture than for asphalt. In many cases it is difficult, if not impossible, to coat wet mineral aggregate satisfactorily with asphaltic compositions. Even when aggregate is already wet or coated with asphalt, water or water vapor slowly permeates the asphalt and loosens or strips the asphalt from the aggregate.

An object of this invention is to provide an asphaltic paving composition which adheres under normal atmospheric conditions to mineral aggregates. Another object of this invention is to provide an asphaltic composition which easily wets the surface of mineral aggregates and adheres tightly thereto even in the presence of moisture. Still another object of this invention is to provide an asphaltic composition which adheres tightly to the surface of mineral aggregates without undue increase in cost. Still another object of this invention is to provide an asphaltic composition which adheres tightly to the surface of mineral aggregates whether they be acidic in nature, as siliceous, or basic in nature, as limestone. Still other objects and advantages of this invention will be realized upon reading the following description which fully describes and illustrates the asphaltic compositions of this invention.

My improved composition comprises a road oil or asphalt, aggregate, and an asphaltic sulfonic acid neutralized with an amine as an agent for preventing or retarding displacement of the asphalt from the surface of the aggregate by moisture. The road oil, or asphalt, and antistripping agent can be mixed and the aggregate subsequently coated with the resulting composition, either hot or cold. The amine additives of this invention can also be employed in an emulsified asphalt as well as in the conventional road oil or nonemulsified asphalt. I have found that because of the alkaline nature of the additive of this invention the adhesion of the asphaltic compositions to siliceous aggregates is improved. I have also found that because of the acidic nature of the additive the asphaltic composition containing same adheres tenaciously to even basic aggregates. The acidic nature of the additive of this invention is due to one portion of the molecule while the alkaline nature of the additive is due to another portion of the molecule, i.e., the acidic nature being due to one or more sulfonic groups and the alkaline nature being due to one or more amino groups.

The antistripping agents of this invention are conveniently prepared by dispersing a heavy asphaltic residuum in a diluent such as normal hexane, treating the dispersed residuum with a sulfonating agent, such as sulfur trioxide, and neutralizing the sulfonated reaction product with an amine. Broadly speaking, the diluted asphaltic residuum is treated with a sulfonating agent; about 1 part by weight of water per 3 parts by weight of residuum is added to the sulfonation product followed by neutralization with the amine. The diluent normal hexane is then removed from the mixture as by distillation. If desired, the hexane can be removed merely by evaporation but distillation is preferred so that the hexane can be recovered.

The terms "asphalt" and "asphaltic material" as used throughout this specification and claims include dark brown to black semisolid or solid cementitious hydrocarbon material which is completely or substantially completely soluble in carbon disulfide, and in which material bitumens are the sole or predominant constituents. Such asphaltic materials occur in nature as such, as, for example, the Trinidad asphalt, and in many crude oils. The asphalt or asphaltic materials are separated from crude oils by distillation as still bottoms. The terms "asphalt" or "asphaltic materials" also include residual products obtained by distillation, precipitation, cracking, oxidation or similar petroleum refining operations. The still bottoms remaining from crude oils or cracking operations can be obtained by distillation at atmospheric, above atmospheric, or below atmospheric pressure, the latter operation ordinarily being termed vacuum distillation. Also, the terms include asphaltic materials obtained from propane extraction of asphaltic crude oils.

Asphaltic materials suitable for preparing the sulfonates of this invention include asphaltenes, maltenes, blown asphalt, straight run residual oils, distillation residues, still bottoms, cracking still residues, asphaltic bitumens, and the like.

Suitable aggregates with which the composition of this invention can advantageously be used include such siliceous aggregates as gravel, sand, sand and gravel mixture, siliceous chat, and the like. Alkaline aggregates include crushed limestone, and caliche. The particle size of the aggregates ordinarily used ranges from that of sand to about 1 inch or so in diameter and may be graded to a more or less uniform size, or may be a mixture of various sizes.

In preparing the sulfonates according to this invention the asphaltic starting material can have a semisolid to solid consistency and is preferably in a granulated or pulverized form. This asphaltic material is dissolved or dispersed in a suitable nonsulfonatable, nonaromatic diluent, such as carbon tetrachloride, chloroform, pentane, n-hexane, octanes, gasoline, kerosene, cyclohexane, diesel fuel, or the like. A portion of the diluent is added prior to sulfonation so as to provide a reacting material in an easily treatable form. All of the diluent can be added prior to sulfonation if desired, or a portion can be added after sulfonation. While liquid sulfur trioxide is a preferred sulfonating agent, such other sulfonating agents as fuming sulfuric acid, chlorosulfonic acid, and concentrated sulfuric acid are also used. Sulfonation is ordinarily carried out at a temperature between the limits of about 0° to 250° F., preferably between the limits of 32° and 100° F. The asphalt-sulfonating agent weight ratio will vary with the sulfonation temperature and the asphalt starting material, but generally will be in the range of about 1:0.12 to 1:1. The sulfonation is ordinarily carried out at a pressure at or near atmospheric.

After completion of the sulfonation reaction the diluent can be separated from the mixture by distillation, simple warming or heating, or extraction with a suitable nonpolar solvent. In some cases the diluent need not be separated from the sulfonation mixture, especially when the heavier or higher boiling oils, such as kerosene or diesel fuel, are used as the diluent and the final additives are to be used in paving compositions. In case the diluent is removed, it is removed as mentioned above. The sulfonation reaction mixture after removal of the diluent can be directly neutralized with the amine or it can be separated first by filtration or other suitable separating means into a sulfonic acid phase and a sludge phase, the latter containing unreacted starting material.

Not all sulfonated asphalts are soluble in normal hexane. Thus, when normal hexane is used as the diluent, the heavier higher boiling sulfonated materials tend to be insoluble in this diluent.

Following the sulfonation operation and removal of the diluent, the sulfonated material is neutralized with an amine containing from 11 to 21 carbon atoms per amine molecule. In these amines at least one amino group is required, preferably a primary amino group, and all amino groups should be primary or secondary amino groups. It is preferred that the amines have a linear or branched linear chain structure. One class of these amines which is suitable for use in the preparation of the additive of this invention is designated as "Diam-21D." This material is a mixture of amines which are believed to have the following structure:

$$R-CH_2-NH-CH_2-CH_2-CH_2-NH_2$$

in which R is an allyl radical containing from 7 to 17 carbon atoms per radical.

The above Diam-21D amine mixture is believed to be prepared from cocoanut oil. A representative cocoanut oil suitable for such preparation contains the following fatty and unsaturated acids:

| | Percent |
|---|---|
| Caprylic acid | 5 |
| Capric acid | 6 |
| Lauric acid | 45 |
| Myristic acid | 20 |
| Palmitic | 9 |
| Stearic | 6 |
| Oleic | 8 |
| Linoleic | 1 |
| | 100 |

To illustrate production of the amines from distilled cocoanut oil I will illustrate production of the amine from lauric acid. The following reactions illustrate this preparation, beginning with lauric acid and resulting in the formation of N-octyl-1,3-propylene diamine:

$$\underset{\text{Lauric acid}}{C_{11}H_{23}COOH} + NH_3 \longrightarrow \underset{\text{Fatty acid nitrile}}{C_{11}H_{23}CN} + 2H_2O$$

$$\underset{\text{Fatty acid nitrile}}{C_{11}H_{23}CN} + \underset{\text{acrylonitrile}}{CH_2=CH-CN} + H_2 \longrightarrow$$

$$\underset{\text{N-dodecyl-1,3-propylene diamine}}{C_{11}H_{23}CH_2-NH-CH_2-CH_2-CH_2-NH_2}$$

All of the acids of the distilled cocoanut oil are believed to react in the same general manner as illustrated above relative to lauric acid for the production of amine derivatives of the above-illustrated cocoanut oil.

To illustrate the above reactions involving the distilled cocoanut oil as illustrated hereinbefore are the following general reactions which are believed to yield the 1,3-propylene diamine mixture called Diam-21D:

Cocoanut oil acids + Ammonia →
                          Mixtures of nitriles + Water
Mixture of nitriles + Acrylonitrile →
                          1,3-propylene diamine mixture As specific examples of several additional amines prepared from components of the above-illustrated cocoanut oil are the following:

Where R=9 carbons: from capric acid $$(C_9H_{19})CH_2NH(CH_2)_3NH_2$$

N-decyl-1,3-propylene diamine

Where R=11 carbons: from lauric acid $$(C_{11}H_{23})CH_2NH(CH_2)_3NH_2$$

N-dodecyl-1,3-propylene diamine

Where R=13 carbons: from myristic acid $$(C_{13}H_{27})CH_2NH(CH_2)_3NH_2$$

N-tetradecyl-1,3-propylene diamine

Where R=15 carbons: from palmitic acid $$(C_{15}H_{31})CH_2NH(CH_2)_3NH_2$$

N-hexadecyl-1,3-propylene diamine

Where R=17 carbons: from stearic acid $$(C_{17}H_{35})CH_2NH(CH_2)_3NH_2$$

N-octadecyl-1,3-propylene diamine

As a specific example for the preparation of the sulfonated asphalt is the following: 26.6 parts by weight of an asphalt obtained as a residue from a 3-stage vacuum distillation operation representing about 3 to 6 percent of a mixture of West Texas and Panhandle crude oils and having a "ring and ball" softening point of 200° F. and a specific gravity of 1.0497 at 60° F. and 62.2 parts by weight of a commercial grade of normal hexane were mixed and 11.2 parts by weight of liquid sulfur dioxide was added as the sulfonating agent. This mixture was maintained at a temperature between 90° and 100° F. for a period of about 1½ hours. After this sulfonation period the diluent hexane was removed by distillation leaving a yield of sulfonated material approximately equal to the weight of the starting asphalt. In this example the weight ratio of the asphalt to sulfonating agent was 1:0.42. To this diluent-free sulfonation product approximately 10 percent by weight of the commercially available Diam-21D was added to neutralize the sulfonate and to make the product soluble in subsequently used asphaltic material. An amount of the above-prepared additive was blended into a SC-2 road oil to give an effective concentration of 1 percent additive. An SC-2 cutback road oil represents a material containing more than 60 percent 100 penetration asphalt in a light gas oil distillate or similar diluent, as determined by ASTM D243 and conforming to other specifications such as those prescribed by the Asphalt Institute:

ASTM D92—Flash, C.O.C., F _____ 175°+
ASTM D88—Viscosity, S.F.S., 140° F _____ 100°-200°
ASTM D4—Solubility in CCl₄, wt. percent ____ 99.5+
ASTM D243—Residue to 100 penetration, wt. percent _____ 60+
ASTM D113—Ductility, 100 penetration residue, cm. _____ 100+
ASTM D402—Total distillation to 680° F., ml__ 5-25
ASTM D139—Float test on dist. residue to 680° F., seconds at 122° F _____ 25-100

The additive as prepared hereinabove is ordinarily used within the limits of about 0.5 to 3 weight percent of the asphaltic or binder composition.

The products of the neutralization of the sulfonated asphalt by the amine may be represented by the following:

*Mechanism of Reaction in Preparation of Additive*

$$R'SO_3H + NH_2(CH_2)_3NHCH_2R \longrightarrow$$

$$R'-\underset{\underset{O}{\|}}{\overset{\overset{O}{\|}}{S}}-\underset{\underset{H}{|}}{\overset{\overset{H}{|}}{N}}-(CH_2)_3\overset{H}{\underset{|}{N}}CH_2R + H_2O$$

In the above illustrative reaction R illustrates the hereinbefore-mentioned alkyl radical of 7 to 17 carbon atoms per radical and R' illustrates the asphaltic residue to which is attached the sulfonate group.

To illustrate the utility of the additive of this invention is the following example:

EXAMPLE I

An aggregate consisting of limestone chips passing a half-inch mesh screen was washed free of fines and further wetted by soaking in water for about 3 hours. After removing excess water by blotting with an absorbent cloth, this aggregate was coated with the above-prepared SC–2 composition containing the additive at approximately 125° F. This material was cured or maintained for a period of about 18 hours at about 110° F. The excess asphalt was separated from the aggregate by transferring the coated aggregate from the original container to another and clean container, the excess asphalt remaining in the original container. The excess asphalt remaining in the original container was weighed and the weight of the asphalt material remaining as coating on the aggregate was obtained by difference between the weight of the asphaltic material added to the aggregate and that remaining in the original container. Approximately 200 parts by weight of water were added to the asphalt wetted aggregate in the second container and this mixture was boiled for about 3 minutes after which treatment it was heated at about 180° F. for 4 hours. After this period of time the container and its contents were removed from the oven and cooled to about 77° F. The stripped asphalt, that is the asphalt displaced or stripped from the surface of the aggregate by the water, floated upon the surface of the water and was extracted therefrom by dissolving in approximately 10 parts by weight of benzene. This benzene solution of asphalt was removed from the water, the benzene evaporated and the weight of the remaining asphalt determined. The percentages of asphalt removed by the stripping action of water were calculated. These values are high in comparison to actual tests made by asphalt-coated aggregate in service because of the severity of the tests, but the values demonstrate the effectiveness of the additive composition in reducing the stripping effect of water. When using coarse aggregate, obviously the percentage of asphalt retained thereon is low due to the decrease in the surface area of such aggregate. In the following tabulation are given results when using 1 percent of additive in an SC–2 road oil in comparison to the same road oil containing no additive.

| Additive | Control, No Additive | 1 Percent Additive |
|---|---|---|
| Aggregate, parts by weight | 100.0 | 101.0 |
| Weight of SC–2, parts by weight | 5.0 | 5.0 |
| Excess SC–2, parts by weight | 2.3 | 1.1 |
| Actual weight of coating, parts by weight | 2.7 | 3.9 |
| Percent coating retained | 54 | 78 |
| Curing time at 100–110° F., hours | 18 | 18 |
| Weight of coating after cure, parts by weight | 1.8 | 3.5 |
| Weight of ʇtripped asphalt, parts by weight | 0.8 | 0.9 |
| Percent asphalt stripped | 44.4 | 25.7 |
| Visual rating | Poor | (1) |

[1] Good–Excellent.

EXAMPLE II

A mixture of Panhandle and West Texas crude oils was topped, the topping bottoms being treated in a vis-breaking operation, and the vis-broken bottoms were subjected to vacuum distillation. The vacuum still bottoms were treated with sulfuric acid thereby yielding an asphalt sulfonic acid. This sulfonic acid was neutralized with caustic soda to produce an asphalt sodium sulfonate. This sodium sulfonate was slurried with water, and acidified with 98 percent sulfuric acid. An amount of Diam-21D amine mixture was added dropwise to the slurried asphalt sulfonate until a pH of between 7.5 and 9.0 was obtained. At this time is was noted that the amine neutralized acids tended to coagulate. Coagulation was complete when acetone was added to the mixture. The coagulated amine salts were removed, dissolved in benzene and water was removed from the mixture by azeotropic distillation. A yield of 68.3 percent, the additive of this invention, was obtained. Based on the sodium sulfonate employed, only 7.3 percent Diam-21D was required for neutralization. The dried neutralization product was added to an MC–3 cutback asphalt to give a 1 percent concentration of additive. Since a homogeneous solution was not obtained, a second sample was prepared by first dissolving the additive in a 50–50 mixture of benzene and kerosene, and adding a sufficient amount of this material to another quantity of MC–3 cutback asphalt to give a 2 percent concentration of additive.

A sulfuric acid sludge was prepared from a Mid-Continent SAE 20 lubricating oil stock in a manner described in Patent 2,705,681, using 3 pounds of 98 percent sulfuric acid per gallon of oil. The acid sludge was separated from unreacted oil and was hydrolyzed. The hydrolyzed sludge was mixed with 5 volumes of water and then neutralized with Diam-21D amine. The amine requirement amounted to 44 percent based on the weight of the sludge. Upon addition of the amine a precipitate was formed which was removed and diluted with cresylic acids obtained from caustic washers treating catalytically cracked gasoline. Ratios of each of the components were essentially the same as revealed in Example I of the above-mentioned patent. After addition of the cresylic acids the material was dehydrated by air blowing at a temperature of about 180° to about 230° F. This dehydrated material was added to another amount of MC–3 cutback asphalt to give a 2 percent concentration of additive.

Coating runs were made by coating a wet aggregate (siliceous chips of Joplin chert) and observing the effectiveness of the coverage of the aggregate with the asphalt. After the coated aggregate was cured at 75° to 80° F. for 18 hours it was covered with tap water and boiled for 3 minutes after which operation the container and its contents were placed in an oven at 180° to 200° F. for 4 hours. Following this oven heating water was decanted away from the mixture and the remaining material was spread on a screen and visually inspected to note the stripping effect of the water. Attempts to recover the stripped asphalt were futile. Upon stripping, the asphalt formed balls around the aggregate chips which remained covered. Effectiveness is reported by visual ratings. The comparison of the effect of the additive of this invention in comparison to the effect of the additive described in Patent 2,705,681 is given in the following tabulation:

| Run Number | 1 | 2 | 3 | Control |
|---|---|---|---|---|
| Percent Asphalt Sulfonate Additive | 1.0 | | 2.0 | 0.0 |
| Percent Acid Sludge Additive | | 2.0 | | 0.0 |
| Coating, percent coverage | 95–100 | 90–95 | 100 | 90–95 |
| Stripping, percent remaining | 90–95 | 75–85 | 98–100 | 50–75 |

It is noted from these data that with the use of 2 percent additive of this invention from 98 to 100 percent of the surface of the aggregate remained coated with asphalt following the water treatment in contrast to only 75 to 85 percent of the surface of the aggregate when the acid sludge additive of the above-mentioned patent was used. When only 1 percent of the additive of this invention was employed, 90 to 95 percent of the surface of the aggregate remained covered with asphalt. A control run was made without the use of any additive and this control run resulted in only 50 to 75 percent of the aggregate surface remaining covered with asphalt. Also these runs indicate that original coverage, prior to the water treatment, when using 2 percent of the additive of this invention was complete. The acid sludge additive of the patent permitted original coverage of 90 to 95 percent of the additive, the same as indicated in the control without the use of any additive.

Thus from these data it is noted that the additive of this invention is materially superior to the acid sludge additive as produced according to Patent 2,705,681.

While certain embodiments of the invention have been described for illustrative purposes, the invention obviously is not limited thereto.

I claim:

1. An anti-stripping composition consisting essentially of an asphaltic material selected from the group consisting of asphalt, road oil, still bottoms from an asphaltic crude oil and asphaltic cracking still bottoms; an aggregate; and an asphalt sulfonic acid neutralized with an amine having the general formula $$R-CH_2-NH-CH_2-CH_2-CH_2-NH_2$$

in which R represents an alkyl group containing from 7 to 17 carbon atoms per alkyl group.

2. An anti-stripping composition consisting essentially of an asphaltic material selected from the group consisting of asphalt, road oil, still bottoms from an asphaltic crude oil and asphaltic cracking still bottoms; an aggregate; and an asphalt sulfonic acid neutralized with an amine having the general formula $$C_{11}H_{23}-CH_2-NH-CH_2-CH_2-CH_2-NH_2$$

3. An anti-stripping composition consisting essentially of an asphaltic material selected from the group consisting of asphalt, road oil, still bottoms from an asphaltic crude oil, and asphaltic cracking still bottoms; and an asphalt sulfonic acid neutralized with an amine having the general formula $$R-CH_2-NH-CH_2-CH_2-CH_2-NH_2$$

in which R represents an alkyl group containing from 7 to 17 carbon atoms per alkyl group.

4. An anti-stripping composition consisting essentially of an asphaltic material selected from the group consisting of asphalt, road oil, still bottoms from an asphaltic crude oil and asphaltic cracking still bottoms; and an asphalt sulfonic acid neutralized with an amine having the general formula $$C_{11}H_{23}-CH_2-NH-CH_2-CH_2-CH_2-NH_2$$

References Cited in the file of this patent

UNITED STATES PATENTS

| | | |
|---|---|---|
| 2,175,189 | Gambrill | Oct. 10, 1939 |
| 2,393,913 | King et al. | Jan. 29, 1946 |
| 2,508,428 | Smith et al. | May 23, 1950 |
| 2,508,432 | Smith et al. | May 23, 1950 |
| 2,901,372 | Dybalski et al. | Aug. 25, 1959 |
| 3,006,846 | Stratton | Oct. 31, 1961 |